(12) United States Patent
Harris et al.

(10) Patent No.: US 11,345,312 B1
(45) Date of Patent: May 31, 2022

(54) SYSTEMS AND METHODS FOR UNLOCKING A VEHICLE

(71) Applicant: Ford Global Technologies, LLC, Dearborn, MI (US)

(72) Inventors: Sam Harris, Essex (GB); Stuart Lane, Woking (GB); Tarik Safir, Chesterfield (GB); Jamie Mahmutyazicioglu, Chelmsford (GB); Endre Hanak, Colchester (GB); Jonathan Hannaford, Loughton (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/323,813

(22) Filed: May 18, 2021

(51) Int. Cl.
*B60R 25/24* (2013.01)
*B60R 25/30* (2013.01)
*H04B 11/00* (2006.01)
*B60R 25/01* (2013.01)

(52) U.S. Cl.
CPC ............. *B60R 25/24* (2013.01); *B60R 25/30* (2013.01); *H04B 11/00* (2013.01); *B60R 25/01* (2013.01)

(58) Field of Classification Search
CPC ......... B60R 25/24; B60R 25/30; B60R 25/01; H04B 11/00
See application file for complete search history.

(56) References Cited

U.S. PATENT DOCUMENTS

| | | | |
|---|---|---|---|
| 8,120,472 B2* | 2/2012 | Sonsterod | B60R 25/1012 340/541 |
| 8,284,041 B2* | 10/2012 | Cuddihy | B60N 2/002 340/457 |
| 11,180,098 B2* | 11/2021 | Wheeler | H04R 19/04 |
| 2004/0130455 A1* | 7/2004 | Prochazka | G06F 3/011 340/4.12 |
| 2012/0008794 A1* | 1/2012 | Gratke | H04R 1/406 381/86 |
| 2012/0229253 A1* | 9/2012 | Kolar | B60R 25/257 340/5.61 |
| 2018/0131524 A1* | 5/2018 | Shin | H04L 9/3242 |
| 2019/0304213 A1* | 10/2019 | Chen | B60W 50/0205 |
| 2020/0247359 A1 | 8/2020 | Murray et al. | |

FOREIGN PATENT DOCUMENTS

EP 3693935 A1 8/2020

OTHER PUBLICATIONS

E. Williams "The Best Car Alarms To Make Your Vehicle More Secure" (Sep. 2020).

* cited by examiner

*Primary Examiner* — Thomas D Alunkal
(74) *Attorney, Agent, or Firm* — Brandon Hicks; Eversheds Sutherland (US) LLP

(57) ABSTRACT

The systems and methods disclosed herein are configured to unlock a vehicle. The systems use a hash function signature for authentication and use a vibration signal to transfer the hash function from a mobile device to a vehicle.

14 Claims, 3 Drawing Sheets

SYSTEMS AND METHODS FOR UNLOCKING A VEHICLE

BACKGROUND

Remote vehicle unlocking mechanisms may require vehicle connectivity to operate. For example, remote vehicle locking mechanisms often require unique hardware or for the user to give up a vehicle key. Software that accesses the vehicle modem may be difficult to implement and may not work when the vehicle is off. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to unlock a vehicle. The systems use a hash function signature for authentication and use a vibration signal to transfer the hash function from a mobile device to a vehicle.

Figure 1:
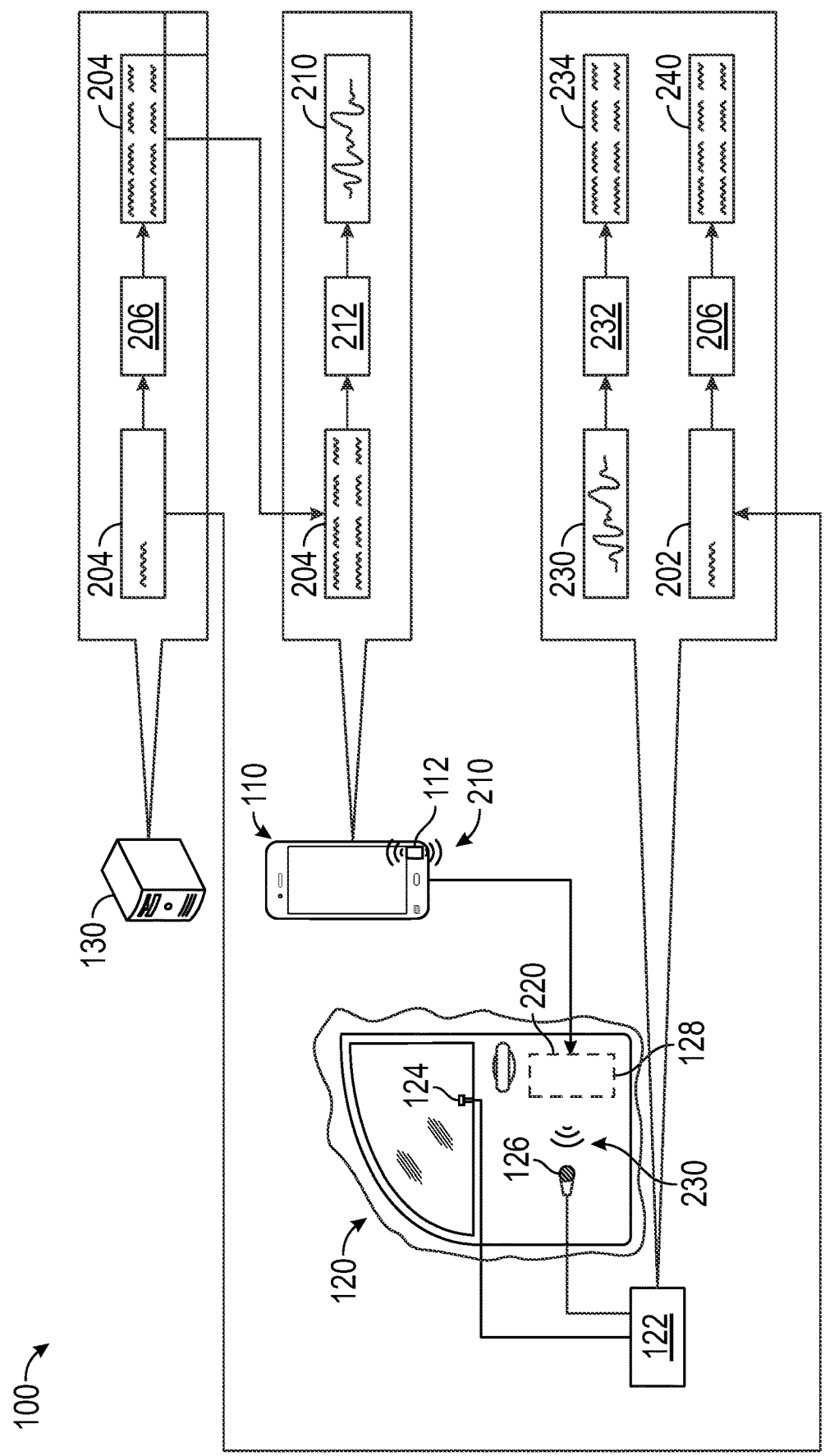
FIG. 1 depicts a system for unlocking a vehicle in accordance with the present disclosure.

Referring to FIG. 1, a system 100 includes a mobile device 110 including a vibration transducer 112 (e.g., vibration motor, haptic or vibrational actuator); a vehicle 120 including a vehicle computer 122, a locking system 124, a microphone 126, and a body panel 128; and a server 130.

The server 130 includes an input key 202 and generates a first hash function signature 204 from the input key 202 using a hash function 206. The server 130 sends the first hash function signature 204 to the mobile device 110. The input key 202 is sent to the vehicle computer 122. For example, the input key 202 is sent or downloaded to the vehicle computer 122 at a time when the vehicle 120 is on and connected to the server 130.

The mobile device 110 converts the first hash function signature 204 into to a first vibration signal 210 using a first transform 212. For example, the mobile device 110 reads the first hash function signature 204 as frequency components of a signal in the frequency domain (e.g., as amplitudes for frequency bands). The first transform 212 (e.g., an inverse Fast Fourier Transform) transforms the first hash function signature 204 into the first vibration signal 210 in the time domain.

The mobile device 110 prompts a user to hold the mobile device 110 against the body panel 128 of the vehicle 120 (e.g., at location 220) and the vibration transducer 112 vibrates according to the first vibration signal 210. Holding the mobile device 110 against the body panel 128 transfers the vibration (e.g., first vibration signal 210) of the vibration transducer 112 to the body panel 128.

The body panel 128 amplifies the first vibration signal 210 and may function as a speaker to generate a second vibration signal 230. The second vibration signal 230 may be the vibration of the body panel 128 or the same transferred to the air inside the vehicle 120 (e.g., a mechanical vibration or acoustic vibration). The amplification of the first vibration signal 210 by the body panel 128 makes the first vibration signal 210 easier to detect (e.g., the signal to noise ratio is improved).

The microphone 126 or other vibration sensor measures the second vibration signal 230 from the body panel 128. The vehicle computer 122 converts the second vibration signal 230 in the time domain to the frequency domain using a second transform 232 (e.g., a Fast Fourier Transform). In the frequency domain, the second vibration signal 230 includes frequency components (amplitude levels in frequency bands) that represent a second hash function signature 234 received from the mobile device 110. The amplitudes of the second hash function signature 234 may be normalized (e.g., for comparison to another hash function signature).

The vehicle computer 122 generates a third hash function signature 240 from the input key 202 using the hash function 206.

The locking system 124 is configured to be controlled by the vehicle computer 122. The vehicle computer 122 compares the second hash function signature 234 received from the mobile device 110 via a vibration signal to the third hash function signature 240 generated from the input key 202 received from the server 130.

If the second hash function signature 234 matches the third hash function signature 240, the mobile device 110 is authenticated both as receiving authorization from the server 130 to unlock the vehicle 120 and as being located at the location of the vehicle 120. Accordingly, if the second hash function signature 234 matches the third hash function signature 240, the vehicle computer 122 controls the locking system 124 to unlock the vehicle 120.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 2:
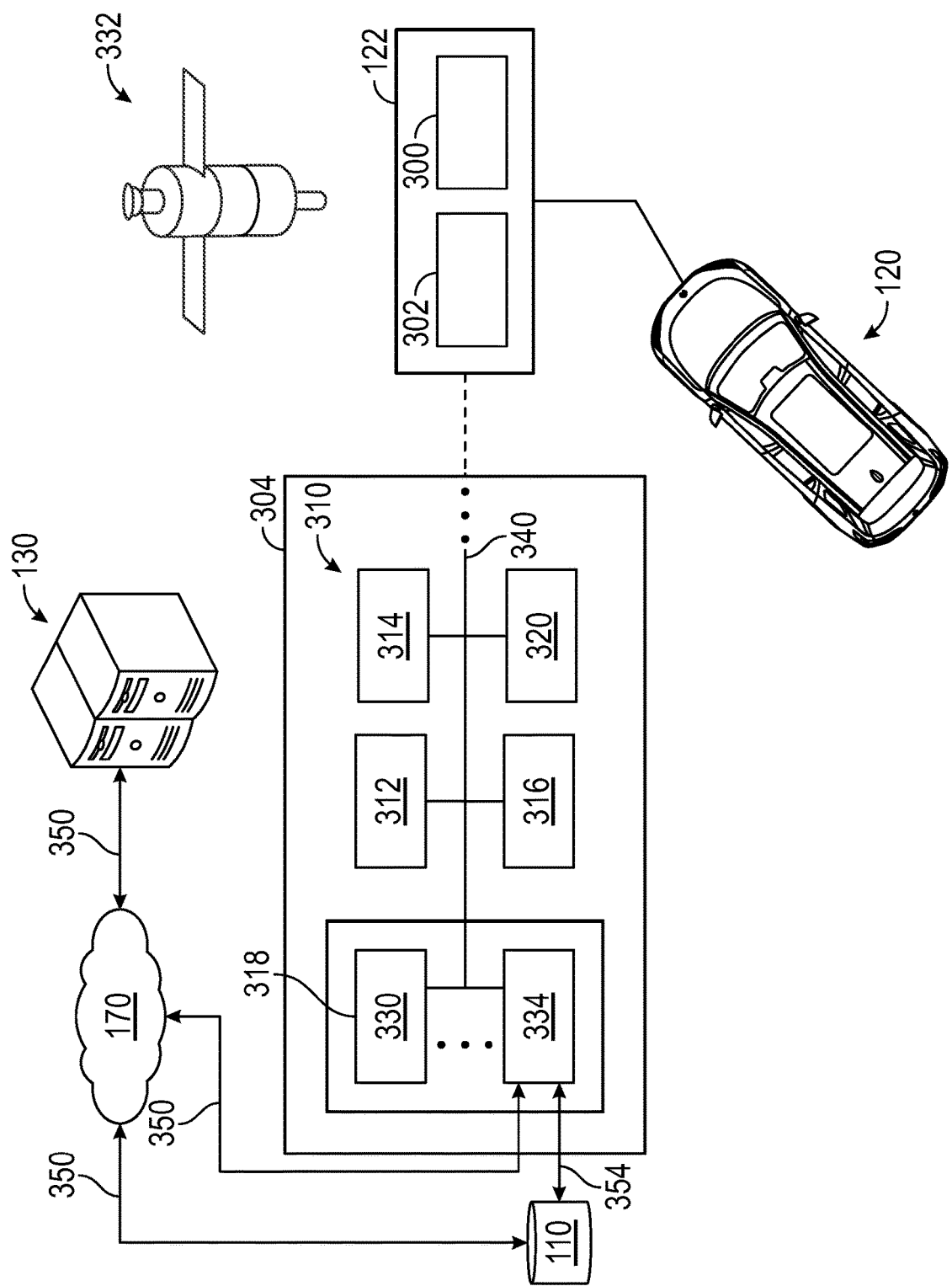
FIG. 2 depicts the system of FIG. 1 in accordance with the present disclosure.

Referring to FIG. 2, the system 100 is described in greater detail.

The vehicle 120 may take the form of a passenger or commercial automobile such as, for example, a truck, a car, a sport utility vehicle, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 120 may be configured as an electric vehicle (EV). More particularly, the vehicle 120 may include a battery EV (BEV) drive system. The vehicle 120 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 120 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 120 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

The vehicle computer 122 includes components including a memory (e.g., memory 300) and a processor (e.g., a processor 302). The mobile device 110 and the server 130 also include a memory and processor. For purposes of teaching, the descriptions of the memory 300 and processor 302 are applicable to the memory and processor of the other elements.

A processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

A memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

Memory is computer readable media on which one or more sets of instructions, such as the software for performing the methods of the present disclosure, can be embedded. The instructions may embody one or more of the methods or logic as described herein. The instructions may reside completely, or at least partially, within any one or more of the memory, the computer readable medium, and/or within the processor during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Continuing with FIG. 2, a vehicle control unit (VCU) 304 includes a plurality of electronic control units (ECUs) 310 disposed in communication with the vehicle computer 122. The VCU 304 may coordinate the data between vehicle systems, connected servers (e.g., server 130), and other vehicles operating as part of a vehicle fleet. The VCU 304 may control aspects of the connected vehicle 120, and implement one or more instruction sets received from a vehicle system controller (such as vehicle computer 122).

The VCU 304 can include or communicate with any combination of the ECUs 310, such as, for example, a Body Control Module (BCM) 312, an Engine Control Module (ECM) 314, a Transmission Control Module (TCM) 316, the Telematics Control Unit 318 (TCU), a Restraint Control Module (RCM) 320, and the like. The TCU 318 may be disposed in communication with the ECUs 310 by way of a Controller Area Network (CAN) bus 340. In some aspects, the TCU 318 may retrieve data and send data as a CAN bus 340 node.

The CAN bus 340 may be configured as a multi-master serial bus standard for connecting two or more of the ECUs 310 as nodes using a message-based protocol that can be configured and/or programmed to allow the ECUs 310 to communicate with each other. The CAN bus 340 may be or include a high-speed CAN (which may have bit speeds up to 1 Mb/s on CAN, 5 Mb/s on CAN Flexible Data Rate (CAN FD), and can include a low-speed or fault tolerant CAN (up to 125 Kbps), which may, in some configurations, use a linear bus configuration. In some aspects, the ECUs 310 may communicate with a host computer (e.g., the vehicle computer 122, and/or server(s) 130 etc.), and may also communicate with one another without the necessity of a host computer.

The CAN bus 340 may connect the ECUs 310 with the vehicle computer 122 such that the vehicle computer 122 may retrieve information from, send information to, and otherwise interact with the ECUs 310 to perform steps described according to embodiments of the present disclosure. The CAN bus 340 may connect CAN bus nodes (e.g., the ECUs 310) to each other through a two-wire bus, which may be a twisted pair having a nominal characteristic impedance. The CAN bus 340 may also be accomplished using other communication protocol solutions, such as Media Oriented Systems Transport (MOST) or Ethernet. In other aspects, the CAN bus 340 may be a wireless intra-vehicle CAN bus.

The VCU 304 may control various loads directly via the CAN bus 340 communication or implement such control in conjunction with the BCM 312. The ECUs 310 described with respect to the VCU 304 are provided for exemplary purposes only, and are not intended to be limiting or exclusive. Control and/or communication with other control modules is possible, and such control is contemplated.

The ECUs 310 may control aspects of vehicle operation and communication using inputs from human drivers, inputs from a vehicle system controller, and/or via wireless signal inputs received via wireless channel(s) from other connected devices. The ECUs 310, when configured as nodes in the CAN bus 340, may each include a central processing unit (CPU), a CAN controller, and/or a transceiver.

The TCU 318 can be configured to provide vehicle connectivity to wireless computing systems onboard and offboard the vehicle 120 and is configurable for wireless communication between the vehicle 120 and other systems, computers, mobile devices 110, servers 130, and modules.

The TCU 318 includes a Navigation (NAV) system 330 for receiving and processing a GPS signal from a GPS 332, a Bluetooth® Low-Energy Module (BLEM) 334, a Wi-Fi transceiver, an Ultra-Wide Band (UWB) transceiver, and/or other wireless transceivers described in further detail below for using near field communication (NFC) protocols, Bluetooth® protocols, Wi-Fi, Ultra-Wide Band (UWB), and other possible data connection and sharing techniques.

The TCU 318 may include wireless transmission and communication hardware that may be disposed in communication with one or more transceivers associated with telecommunications towers and other wireless telecommunications infrastructure. For example, the BLEM 334 may be configured and/or programmed to receive messages from, and transmit messages to, one or more cellular towers associated with a telecommunication provider, and/or and a Telematics Service Delivery Network (SDN) associated with the vehicle 120 for coordinating vehicle fleet.

The BLEM 334 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 334 may include Generic Attribute Profile (GATT) device connectivity for client devices that respond to or initiate GATT commands and requests.

External servers 130, may be communicatively coupled with the vehicle 120 via one or more network(s) 170, which may communicate via one or more wireless channel(s) 350. The wireless channel(s) 350 are depicted in FIG. 2 as communicating via the one or more network(s) 170.

The mobile device 110 may be connected via direct communication (e.g., channel 354) with the vehicle 120 using near field communication (NFC) protocols, Bluetooth® protocols, Wi-Fi, Ultra-Wide Band (UWB), and other possible data connection and sharing techniques.

The network(s) 170 illustrate example communication infrastructure in which the connected devices discussed in various embodiments of this disclosure may communicate. The network(s) 170 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, WiMAX (IEEE 802.16m), Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), Universal Mobile Telecommunications System (UMTS), Long Term Evolution (LTE), and the like.

The BCM 312 generally includes an integration of sensors, vehicle performance indicators, and variable reactors associated with vehicle systems, and may include processor-based power distribution circuitry that can control functions associated with the vehicle body such as lights, windows, security, microphone 126, the locking system 124 (e.g., door locks and access control), and various comfort controls. The BCM 312 may also operate as a gateway for bus and network interfaces to interact with remote ECUs.

The BCM 312 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc.

The BCM 312 may be configured for vehicle energy management, exterior lighting control, wiper functionality, power window and door functionality, heating ventilation and air conditioning systems, and driver integration systems. In other aspects, the BCM 312 may control auxiliary equipment functionality, and/or is responsible for integration of such functionality. In one aspect, a vehicle having a vehicle control system may integrate the system using, at least in part, the BCM 312.

Vehicle systems of the connected vehicle 120, such as the locking system 124, can be controlled based on a match between a hash function signature received from vibration of a mobile device and a hash function signature from input received from a server.

The hash function 206 is mathematical algorithm that maps an input key 202 (e.g., data of an arbitrary size) to a hash function signature 204, 240. The hash function signature 204, 240 is a bit array of a fixed size. A hash function signature may also be referred to as a hash value, hast, message digest, and the like.

The hash function 206 is a one-way function such that the same input key 202 produces the same hash function signature 204, 240 and different input keys produce different hash function signatures. Accordingly, a hash function signature 204, 240 can be used to authenticate the input key 202 by checking that a hash function signature matches a hash of an input key.

The system 100 uses a hash function signatures created through two different channels (the mobile device 110 and the vehicle 120) for authentication and control of the locking system 124. The system 100 also uses a vibration method to transfer the hash function signature from the mobile device 110 to the vehicle 120. Such a transfer method may be used, for example, when the vehicle 120 is not powered on for communication.

To convert between a hash signature and a vibration signal, a transform (e.g., a Fourier transform or inverse Fourier transform may be used). Here, the hash function signature can be treated as frequency components of a frequency domain signal. An inverse Fourier transform can be applied to the hash function signature to convert the hash function signature into a time domain vibration signal. A Fourier transform can transform a time domain vibration signal into a frequency domain signal with the frequency components representing a hash function signature.

Figure 3:
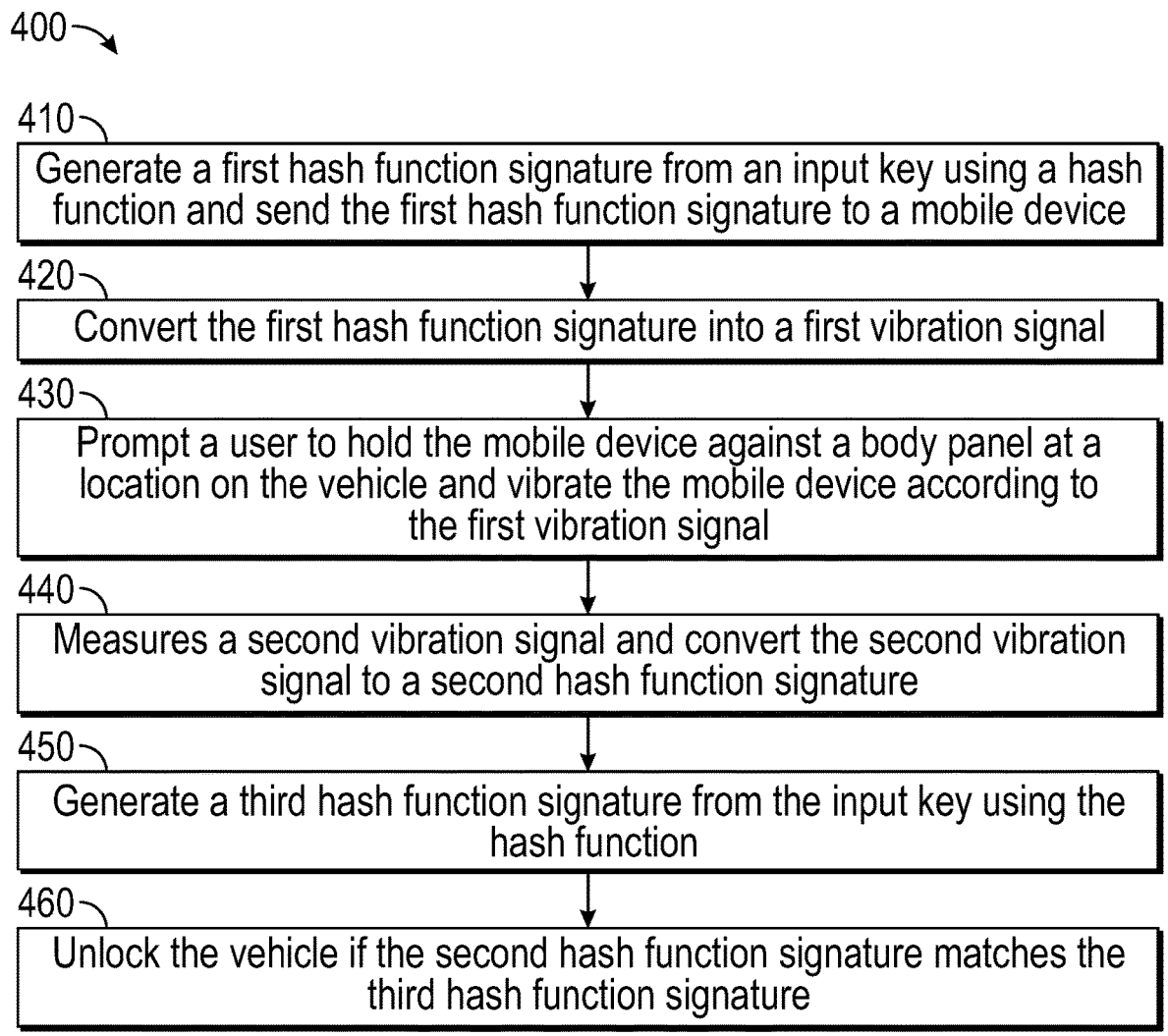
FIG. 3 depicts a method in accordance with the present disclosure.

Referring to FIG. 3, according to a first step 410 of an exemplary method 400, the server 130 generates a first hash function signature 204 from the input key 202 using a hash function 206. The server 130 sends the first hash function signature 204 to the mobile device 110. The input key 202 is sent to the vehicle computer 122, which includes the hash function 206. For example, the input key 202 is sent or downloaded to the vehicle computer 122 at a time when the vehicle 120 is on or running and connected to the server 130.

According to a second step 420, the mobile device 110 converts the first hash function signature 204 into to a first vibration signal 210 using a first transform 212. For example, the mobile device 110 reads the first hash function signature 204 as frequency components of a signal in the frequency domain (e.g., as amplitudes for frequency bands). The first transform 212 transforms (e.g., using an inverse Fast Fourier Transform) the first hash function signature 204 into the first vibration signal 210 in the time domain.

According to a third step 430, the mobile device 110 may prompt a user to hold the mobile device 110 against the body panel 128 at a location 220 on the vehicle 120 and the vibration transducer 112 vibrates according to the first vibration signal 210. Holding the mobile device 110 against the body panel 128 transfers the vibration (e.g., first vibration signal 210) of the vibration transducer 112 to the body panel 128.

The body panel 128 amplifies the first vibration signal 210 and may function as a speaker to generate a second vibration signal 230. The second vibration signal 230 may be the vibration of the body panel 128 or the same transferred to the air inside the vehicle 120 (e.g., a mechanical vibration or acoustic vibration). The amplification of the first vibration signal 210 by the body panel 128 makes the first vibration signal 210 easier to detect (e.g., the signal to noise ratio is improved).

According to a fourth step 440, the microphone 126 or other vibration sensor measures the second vibration signal 230 from the body panel 128. The vehicle computer 122 converts the second vibration signal 230 in the time domain to the frequency domain using a second transform 232 (e.g., a Fast Fourier Transform). In the frequency domain, the second vibration signal 230 includes frequency components (e.g., amplitude levels in frequency bands) that represent a second hash function signature 234 received from the mobile device 110. The amplitudes of the second hash function signature 234 may be normalized (e.g., for comparison to another hash function signature).

According to a fifth step 450, the vehicle computer 122 generates a third hash function signature 240 from the input key 202 using the hash function 206.

According to a sixth step 460, the vehicle computer 122 compares the second hash function signature 234 received from the mobile device 110 via a vibration signal to the third hash function signature 240 generated from the input key 202 received from the server 130. If the second hash function signature 234 matches the third hash function signature 240, the mobile device 110 is authenticated both as receiving authorization from the server 130 to unlock the vehicle 120 and as being located at the location of the vehicle 120. Accordingly, if the second hash function signature 234 matches the third hash function signature 240, the vehicle computer 122 controls the locking system 124 to unlock the vehicle 120.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   measuring, at a vehicle, a first vibration signal;
   converting the first vibration signal to a first hash function signature;
   generating a second hash function signature using an input key and a hash function;
   unlocking the vehicle based on the first hash function signature matching the second hash function signature;
   receiving, at a mobile device, a third hash function signature; and
   converting, with the mobile device, the third hash function signature to a second vibration signal.

2. The method of claim 1, wherein the first vibration signal is converted to the first hash function signature using a transform.

3. The method of claim 1, wherein the first vibration signal is vibration of a body panel of the vehicle.

4. The method of claim 1, wherein the third hash function signature is converted to the second vibration signal using a transform.

5. The method of claim 1, further comprising vibrating the mobile device based on the second vibration signal.

6. The method of claim 5, further comprising prompting a user to hold the mobile device against the vehicle.

7. The method of claim 1, further comprising receiving at the vehicle the input key.

8. A system, comprising:
a mobile device; and
a vehicle, comprising:
   a microphone;
   a locking system;
   a processor; and
   a memory comprising:
      an input key;
      a hash function; and
      instructions that, when executed by the processor, cause the processor to perform operations comprising:
         measuring, with the microphone, a vibration signal;
         converting the vibration signal to a first hash function signature;
         generating a second hash function signature using the input key and the hash function; and
         controlling the locking system to unlock the vehicle if the first hash function signature matches the second hash function signature,
   wherein the mobile device is configured to receive a third hash function signature and convert the third hash function signature to a second vibration signal.

9. The system of claim 8, wherein the vibration signal is converted to the first hash function signature using a transform.

10. The system of claim 8, wherein the vibration signal is vibration of a body panel of the vehicle.

11. The system of claim 8, wherein the third hash function signature is converted to the second vibration signal using a transform.

12. The system of claim 8, wherein the mobile device is configured to vibrated based on the second vibration signal.

13. The system of claim 12, wherein the mobile device is configured to prompt a user to hold the mobile device against the vehicle.

14. The system of claim 8, further comprising the instructions that, when executed by the processor, cause the processor to perform operations comprising receiving at the vehicle the input key.

* * * * *